(12) United States Patent
Tamai

(10) Patent No.: US 9,099,937 B2
(45) Date of Patent: Aug. 4, 2015

(54) POWER CONVERTER CAPABLE OF OUTPUTTING A PLURALITY OF DIFFERENT LEVELS OF VOLTAGES

(71) Applicant: TOSHIBA MITSUBISHI-ELECTRIC INDUSTRIAL SYSTEMS CORPORATION, Tokyo (JP)

(72) Inventor: Shinzo Tamai, Minato-ku (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 0 days.

(21) Appl. No.: 14/138,980

(22) Filed: Dec. 23, 2013

(65) Prior Publication Data

US 2014/0192572 A1 Jul. 10, 2014

(30) Foreign Application Priority Data

Jan. 8, 2013 (JP) ................................. 2013-001132

(51) Int. Cl.
 *H02H 7/09* (2006.01)
 *H02M 7/483* (2007.01)
 *H02M 7/487* (2007.01)
 *H02M 1/00* (2007.01)

(52) U.S. Cl.
 CPC .............. *H02M 7/483* (2013.01); *H02M 7/487* (2013.01); *H02M 2001/007* (2013.01)

(58) Field of Classification Search
 CPC ................ H02M 7/483; H02M 7/487; H02M 2001/007; H02H 7/09
 USPC ......... 363/17, 56.12, 56.02, 56.03, 56.05, 98, 363/132
 See application file for complete search history.

(56) References Cited

U.S. PATENT DOCUMENTS

| 2,631,249 | A | * | 3/1953 | Smith ........................... 307/110 |
| 4,900,947 | A | * | 2/1990 | Weiner et al. ................. 307/110 |
| 7,292,460 | B2 | | 11/2007 | Barbosa et al. |
| 2013/0088901 | A1 | * | 4/2013 | Bleus et al. ..................... 363/71 |
| 2014/0292089 | A1 | * | 10/2014 | Tamai ............................ 307/82 |
| 2014/0300195 | A1 | * | 10/2014 | Tamai ............................ 307/82 |

FOREIGN PATENT DOCUMENTS

| JP | 2000-341964 | 12/2000 |
| JP | 2010-246267 | 10/2010 |

OTHER PUBLICATIONS

U.S. Appl. No. 14/183,985, filed Feb. 19, 2014, Tamai.

(Continued)

*Primary Examiner* — Adolf Berhane
*Assistant Examiner* — Nusrat Quddus
(74) *Attorney, Agent, or Firm* — Oblon, McClelland, Maier & Neustadt, L.L.P.

(57) ABSTRACT

A power converter includes a group of serial three-level inverters including $2^n$ (n=2) three-level inverters connected in series, two switch circuits for selecting an output from either one of two of the three-level inverters in the group of serial three-level inverters, and a switch circuit for selecting an output from either one of the switch circuits. Each three-level inverter includes two switch elements connected in series, two capacitors connected in series, and a switch element for connecting the first node to the second node, the switch elements being connected in parallel to the capacitors.

3 Claims, 6 Drawing Sheets

(56) References Cited

OTHER PUBLICATIONS

U.S. Appl. No. 14/184,030, filed Feb. 19, 2014, Tamai.

L.A. Serpa, et al., "Virtual-Flux Decoupling Hysteresis Control for the Five-Level ANPC Inverter Connected to the Grid", IEEE, 2008, 6 pages.

* cited by examiner

POWER CONVERTER CAPABLE OF OUTPUTTING A PLURALITY OF DIFFERENT LEVELS OF VOLTAGES

BACKGROUND OF THE INVENTION

1. Field of the Invention

The present invention relates to power converters, and particularly to a power converter capable of outputting a plurality of different levels of voltages.

2. Description of the Background Art

A power converter that converts direct current (DC) power to alternating current (AC) power by varying continuous output of DC voltages from a plurality of DC power sources during a single cycle has been proposed. This power converter converts DC power to AC power by continuously outputting a plurality of DC voltages of different potentials, rather than generating a constant pulsed voltage like an inverter having a single DC power source. Accordingly, this power converter can continuously output the plurality of DC voltages of different potentials finely without waste, to convert DC power to AC power with suppressed harmonics compared with a power converter having a single DC power source.

For example, Japanese Patent Laying-Open No. 2000-341964 discloses a multilevel inverter as the above-described power converter. According to this patent publication, the multilevel inverter includes redox flow type secondary batteries connected in series and producing multilevel terminal voltages, and an inverter unit for controlling continuous output of potentials of the multilevel terminals to produce AC power. The inverter unit includes a total of eight switching elements and six diodes, and controls the opening/closing of the switching elements in response to instructions from a control unit.

FIG. 7 is a circuit diagram illustrating a circuit configuration of a conventional power converter such as disclosed in the aforementioned patent publication. A power converter 100 illustrated in FIG. 7 is a five-level inverter capable of outputting five different levels of voltages. Power converter 100 includes four DC power sources V, eight switch elements S101 to S108, and six diodes D101 to D106.

Power converter 100 has a midpoint $V_0$ as the middle point between four DC power sources V, midpoint $V_0$ having a voltage level of "0V". Accordingly, in power converter 100, the first DC power source V on the positive potential side relative to midpoint $V_0$ has a voltage level of "+1V", and the second DC power source V on the positive potential side relative to midpoint $V_0$ has a voltage level of "+2V". Conversely, in power converter 100, the first DC power source V on the negative potential side relative to midpoint $V_0$ has a voltage level of "−1V", and the second DC power source V on the negative potential side relative to midpoint $V_0$ has a voltage level of "−2V".

Power converter 100 can output a potential having a voltage level of "+2V" from an output terminal by turning switch elements S101, S102, S103 and S104 on, and can output a potential having a voltage level of "+1V" from the output terminal by turning switch elements S102, S103, S104 and S105 on. Power converter 100 can also output a potential having a voltage level of "0V" from the output terminal by turning switch elements S103, S104, S105 and S106 on. Power converter 100 can further output a potential having a voltage level of "−1V" from the output terminal by turning switch elements S104, S105, S106 and S107 on, and can output a potential having a voltage level of "−2V" from the output terminal by turning switch elements S105, S106, S107 and S108 on. Thus, power converter 100 can output five different of levels of voltages ("−2V", "−1V", "0V", "+1V", "+2V") from the output terminal.

In power converter 100, however, when switch elements S105, S106, S107 and S108 are turned on in order to output a potential having a voltage level of "−2V" from the output terminal, diodes D102, D104 and D106 each have a voltage level of "−2V" at its anode terminal, with diode D102 having a cathode terminal connected to a voltage level of "+1V". Therefore, a voltage corresponding to the sum of voltages of three DC power sources V is applied to diode D102. Similarly, a voltage corresponding to the sum of voltages of two DC power sources V is applied to diode D104, and a voltage corresponding to a voltage of one DC power source V is applied to diode D106.

Moreover, in power converter 100, when switch elements S101, S102, S103 and S104 are turned on in order to output a potential having a voltage level of "+2V" from the output terminal, diodes D101, D103 and D105 each have a voltage level of "+2V" at its cathode terminal, with diode D105 having an anode terminal connected to a voltage level of "−1V". Therefore, a voltage corresponding to the sum of voltages of three DC power sources V is applied to diode D105. Similarly, a voltage corresponding to the sum of voltages of two DC power sources V is applied to diode D103, and a voltage corresponding to a voltage of one DC power source V is applied to diode D101.

As such, in the multilevel inverter disclosed in the aforementioned patent publication, diodes D102 and D105 connecting the DC power sources to the switch elements are required to have a breakdown voltage three times higher than that of diodes D101 and D106, and diodes D103 and D104 are required to have a breakdown voltage two times higher than that of diodes D101 and D106, respectively. For this reason, the multilevel inverter disclosed in the aforementioned patent publication needs to employ diodes having different breakdown voltages, or to connect two or three diodes in series to increase the breakdown voltage, thus increasing the complexity of the apparatus and the difficulty in manufacturing the apparatus.

Furthermore, in the multilevel inverter disclosed in the aforementioned patent publication, increasing the number of levels of voltages to be output requires higher breakdown voltages of the diodes. This increases the complexity of the configuration of the diodes connected between the DC power sources and the switch elements, and further increases the difficulty in manufacturing the apparatus.

SUMMARY OF THE INVENTION

An object of the present invention is to provide a power converter having an easy to manufacture configuration.

In summary, a power converter according to the present invention includes a group of serial three-level inverters including $2^n$ three-level inverters each capable of outputting three levels of voltages connected in series, n being an integer of 2 or more, and a switch circuit for selecting an output from either one of two of the three-level inverters in the group of serial three-level inverters. The three-level inverters each include a first switch element and a second switch element connected in series, a first charge storage element and a second charge storage element connected in series, and a third switch element for connecting a first node between the first switch element and the second switch element to a second node between the first charge storage element and the second charge storage element. In the three-level inverter, the first switch element and the second switch element are connected in parallel to the first charge storage element and the second charge storage element. The three-level inverter can output three levels of voltages by a combination of on states and off states of the first switch element to the third switch element. The group of serial three-level inverters includes $2^n$ three-level inverters connected in series by repeated connection of a fourth node between the second switch element and the second charge storage element in one of the three-level inverters to a fifth node between the first switch element and the first charge storage element in another of the three-level inverters adjacent to the one of the three-level inverters, $2^{n-1}$ switch circuits being connected to be able to select an output from either one of the two adjacent three-level inverters in the group of serial three-level inverters. When there are two or more switch circuits, the switch circuit in a following stage is connected to be able to select an output from either one of the two switch circuits connected in a previous stage, thereby providing one output.

As such, the present invention includes the group of serial three-level inverters having a plurality of three-level inverters connected in series, and the switch circuit for selecting an output from one of the plurality of three-level inverters. Accordingly, elements required to have a breakdown voltage can be concentrated on the switch circuit regardless of the number of levels of voltages to be output, thereby realizing an easy to manufacture configuration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
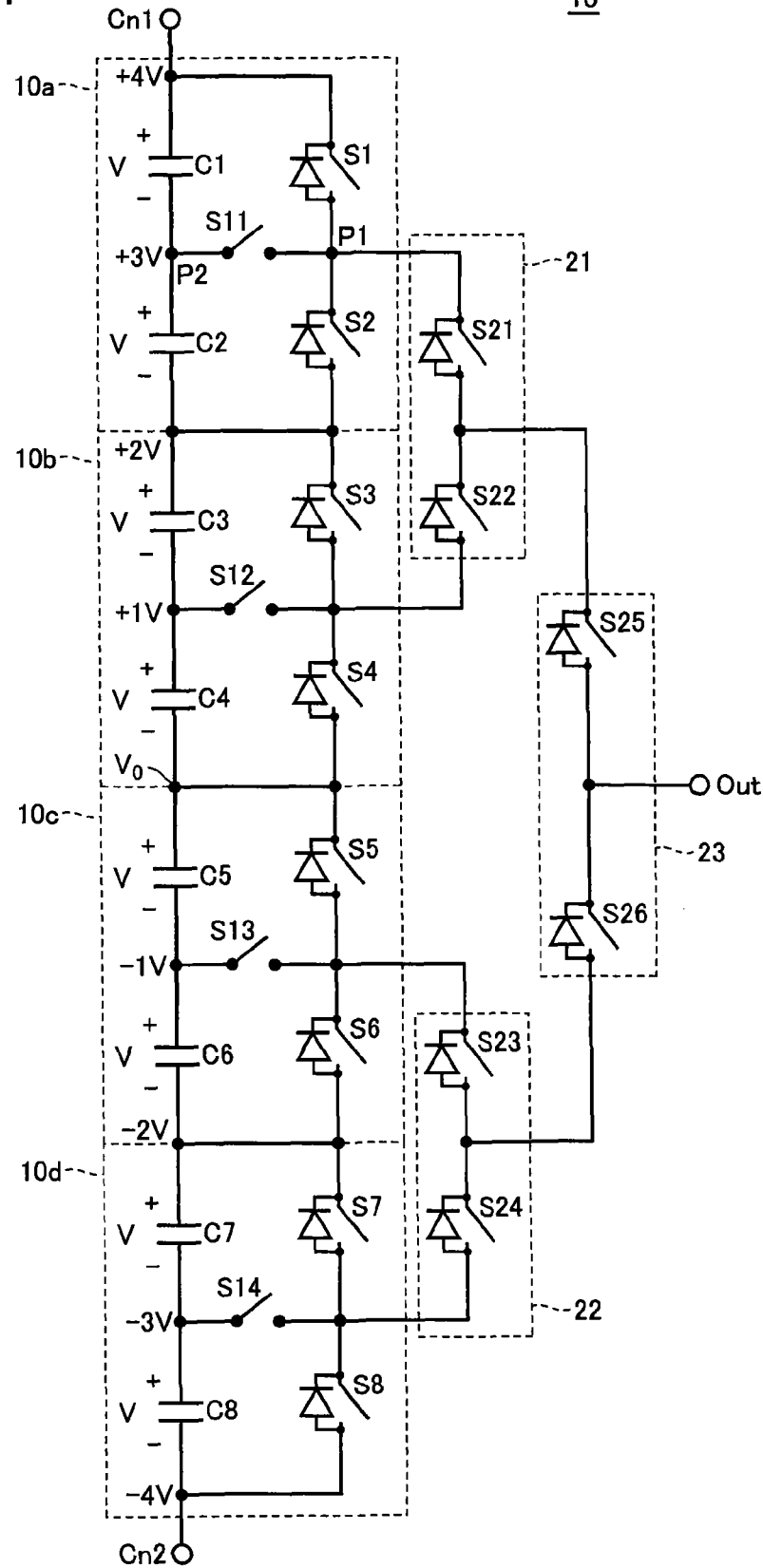
FIG. 1 is a circuit diagram illustrating a circuit configuration of a power converter according to an embodiment of the present invention.

The embodiments of the present invention will be hereinafter described in detail with reference to the drawings, in which the same or corresponding parts are designated by the same reference characters, and description thereof will not be repeated.

FIG. 1 is a circuit diagram illustrating a circuit configuration of a power converter according to an embodiment of the present invention. A power converter 10 illustrated in FIG. 1 is a nine-level inverter capable of outputting nine different levels of voltages. Power converter 10 includes eight DC power sources V (capacitors C1 to C8), eighteen switch elements S1 to S8, S11 to S14 and S21 to S26, connection terminals Cn1 and Cn2, and an output terminal Out. It is noted that a free wheel diode is connected to each of switch elements S1 to S8 and S21 to S26.

Power converter 10 includes a group of serial three-level inverters having four three-level inverters 10a, 10b, 10c and 10d each capable of outputting three different levels of voltages connected in series, a switch circuit 21 for selecting an output from either one of two three-level inverters 10a and 10b, a switch circuit 22 for selecting an output from either one of two three-level inverters 10c and 10d, and a switch circuit 23 in a following stage capable of selecting an output from either one of two switch circuits 21 and 22 connected in a previous stage.

Three-level inverter 10a includes two switch elements S1 and S2 connected in series, capacitors C1 and C2 serving as DC power sources V connected in series, and switch element S11 for connecting a node P1 (first node) between switch elements S1 and S2 to a node P2 (second node) between capacitors C1 and C2. Switch elements S1 and S2 are connected in parallel to capacitors C1 and C2. It is noted that three-level inverters 10b, 10c and 10d have a circuit configuration identical to that of three-level inverter 10a, and therefore detailed description thereof will not be repeated.

Switch circuit 21 includes switch elements S21 and S22, and selects an output from three-level inverter 10a or 10b when switch element S21 or S22 is turned on. Switch circuit 22 includes switch elements S23 and S24, and selects an output from three-level inverter 10c or 10d when switch element S23 or S24 is turned on. Switch circuit 23 includes switch elements S25 and S26, and selects an output from switch circuit 21 or 22 when switch element S25 or S26 is turned on.

Power converter 10 has a midpoint $V_0$ as the middle point between eight DC power sources V, midpoint $V_0$ having a voltage level of "0V". Accordingly, nodes between the four DC power sources V on the upper side of midpoint $V_0$ have voltage levels of "+1V", "+2V" and "+3V" successively from the side closer to midpoint $V_0$, and nodes between the four DC power sources V on the lower side of midpoint $V_0$ have voltage levels of "−1V", "−2V" and "−3V" successively from the side closer to midpoint $V_0$. In addition, a node between DC power source V and switch element S1 has a voltage level of "+4V", and a node between DC power source V and switch element S8 has a voltage level of "−4V".

Three-level inverter 10a can output a positive-side potential of "+4V" of capacitor C1 when switch element S1 is turned on, and can output a potential of "+3V" of node P2 between capacitors C1 and C2 connected in series when switch element S11 is turned on. Three-level inverter 10a can also output a negative-side potential of "+2V" of capacitor C2 when switch element S2 is turned on. Thus, three-level inverter 10a can output three levels of voltages "+4V", "+3V" and "+2V". Three-level inverter 10b can operate in the same way as three-level inverter 10a, and can therefore output three levels of voltages "+2V", "+1V" and "0V". Three-level inverter 10c can also operate in the same way as three-level inverter 10a, and can therefore output three levels of voltages "0V", "−1V" and "−2V". Three-level inverter 10d can also operate in the same way as three-level inverter 10a, and can therefore output three levels of voltages "−2V", "−3V" and "−4V".

Thus, power converter 10 can output nine different levels ("−4V", "−3V", "−2V", "−1V", "0V", "+1V", "+2V", "+3V", "+4V") of voltages from output terminal Out by switching between on states and off states of the switch elements in switch circuits 21 to 23 to select an output from one of three-level inverters 10a to 10d connected in series.

Figure 2:
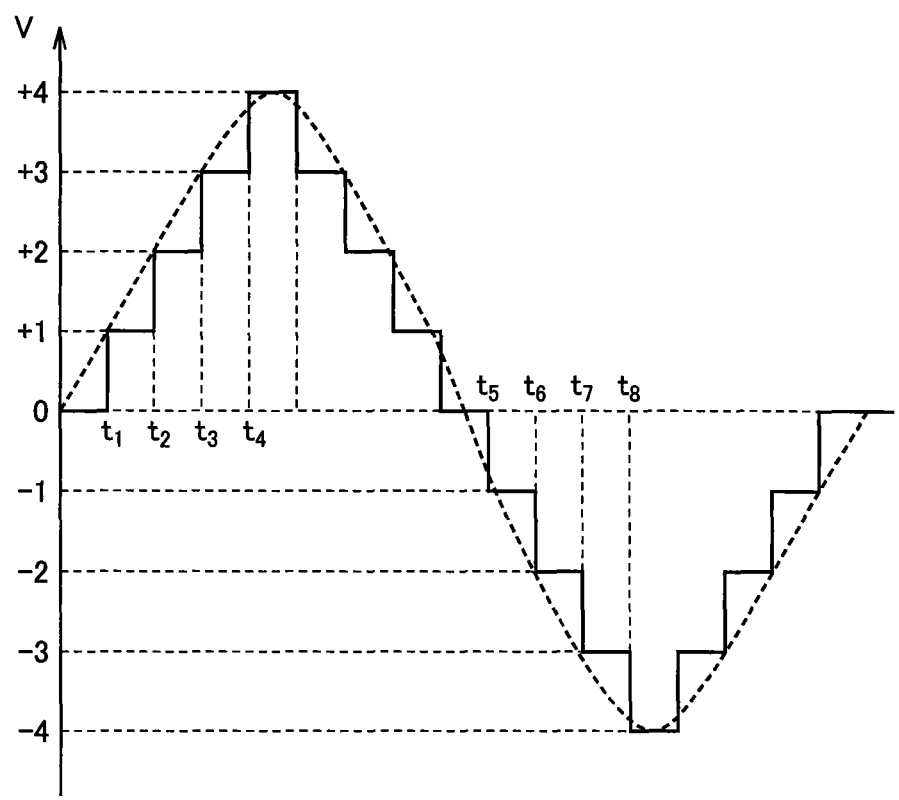
FIG. 2 is a waveform diagram illustrating a waveform of levels of voltages output from the power converter illustrated in FIG. 1.

The operation of power converter 10 is now described. FIG. 2 is a waveform diagram illustrating a waveform of levels of voltages output from power converter 10 illustrated in FIG. 1.

First, power converter 10 outputs a voltage having a level of "0V" from output terminal Out by turning switch element S4 on, switch element S22 of switch circuit 21 on, and switch element S25 of switch circuit 23 on. Then, at time $t_1$, power converter 10 outputs a voltage having a level of "+1V" from output terminal Out by turning switch element S12 on, switch element S22 of switch circuit 21 on, and switch element S25 of switch circuit 23 on.

Then, at time $t_2$, power converter 10 outputs a voltage having a level of "+2V" from output terminal Out by turning switch element S3 on, switch element S22 of switch circuit 21 on, and switch element S25 of switch circuit 23 on.

It is noted that power converter 10 may output a voltage having a level of "+2V" from output terminal Out by turning switch element S2 on, switch element S21 of switch circuit 21 on, and switch element S25 of switch circuit 23 on.

Then, at time $t_3$, power converter 10 outputs a voltage having a level of "+3V" from output terminal Out by turning switch element S11 on, switch element S21 of switch circuit 21 on, and switch element S25 of switch circuit 23 on.

Then, at time $t_4$, power converter 10 outputs a voltage having a level of "+4V" from output terminal Out by turning switch element S1 on, switch element S21 of switch circuit 21 on, and switch element S25 of switch circuit 23 on. Subsequently, power converter 10 successively lowers the voltage level at output terminal Out to "+3V", "+2V", "+1V" and "0V".

It is noted that power converter 10 may output a voltage having a level of "0V" from output terminal Out by turning switch element S5 on, switch element S23 of switch circuit 22 on, and switch element S26 of switch circuit 23 on.

At time $t_5$, power converter 10 outputs a voltage having a level of "−1V" from output terminal Out by turning switch element S13 on, switch element S23 of switch circuit 22 on, and switch element S26 of switch circuit 23 on.

Then, at time $t_6$, power converter 10 outputs a voltage having a level of "−2V" from output terminal Out by turning switch element S6 on, switch element S23 of switch circuit 22 on, and switch element S26 of switch circuit 23 on.

It is noted that power converter 10 may output a voltage having a level of "−2V" from output terminal Out by turning switch element S7 on, switch element S24 of switch circuit 22 on, and switch element S26 of switch circuit 23 on.

Then, at time $t_7$, power converter 10 outputs a voltage having a level of "−3V" from output terminal Out by turning switch element S14 on, switch element S24 of switch circuit 22 on, and switch element S26 of switch circuit 23 on.

Then, at time $t_8$, power converter 10 outputs a voltage having a level of "−4V" from output terminal Out by turning switch element S8 on, switch element S24 of switch circuit 22 on, and switch element S26 of switch circuit 23 on. Subsequently, power converter 10 successively raises the voltage level at output terminal Out to "−3V", "−2V", "−1V" and "0V".

By performing the operation of switching between the nine different voltage levels ("−4V", "−3V", "−1V", "0V", "+1V", "+2V", "+3V", "+4V") and outputting the voltages as described above, power converter 10 can output an AC voltage as indicated with a broken line illustrated in FIG. 2, thereby converting DC power to AC power.

In three-level inverters 10a to 10d, when component switch elements S1 to S8, S11 to S14 and S21 to S26 are off, only a voltage corresponding to up to the sum of voltages of two capacitors is applied to opposite ends of the elements. For example, when switch element S1 is on and switch elements S2 and S11 are off in three-level inverter 10a, a voltage corresponding to the sum of voltages of two capacitors is applied to opposite ends of switch element S2, and a voltage corresponding to a voltage of one capacitor is applied to opposite ends of switch element S11.

If a voltage of "+4V" is to be output from output terminal Out, in switch circuit 21, switch element S21 is turned on and switch element S22 is turned off, causing a voltage of "+4V" to be applied to one end of switch element S22. By turning switch element S3 of three-level inverter 10b on, however, switch circuit 21 can be controlled such that a voltage of "+2V" is applied to the other end of switch element S22, so that a voltage corresponding to up to the sum of voltages of two capacitors is applied to the opposite ends of switch element S22. Switch circuit 22 can be similarly controlled such that a voltage corresponding to up to the sum of voltages of two capacitors is applied to the switch element therein.

If a voltage of "+4V" or "−4V" is to be output from output terminal Out, in switch circuit 23, a voltage corresponding to the sum of voltages of four capacitors is applied to opposite ends of switch element S25 or S26. That is, switch circuit 23 can be controlled such that a voltage of up to two times the voltage applied to switch circuit 21 or 22 is applied to the switch element therein.

As described above, power converter 10 according to the embodiment of the present invention includes the group of serial three-level inverters in which four three-level inverters 10a, 10b, 10c and 10d are connected in series and in which an element having a particularly high breakdown voltage is not required, and switch circuits 21 to 23. Therefore, elements to which a high voltage is applied can be limited to the elements constituting switch circuits 21 to 23. That is, power converter 10 can be readily manufactured as a multilevel inverter capable of outputting nine or more levels of voltages, simply by connecting four or more three-level inverters formed of available elements having a certain breakdown voltage in series, and by providing a switch circuit for selecting an output from one of the three-level inverters.

Figure 3:
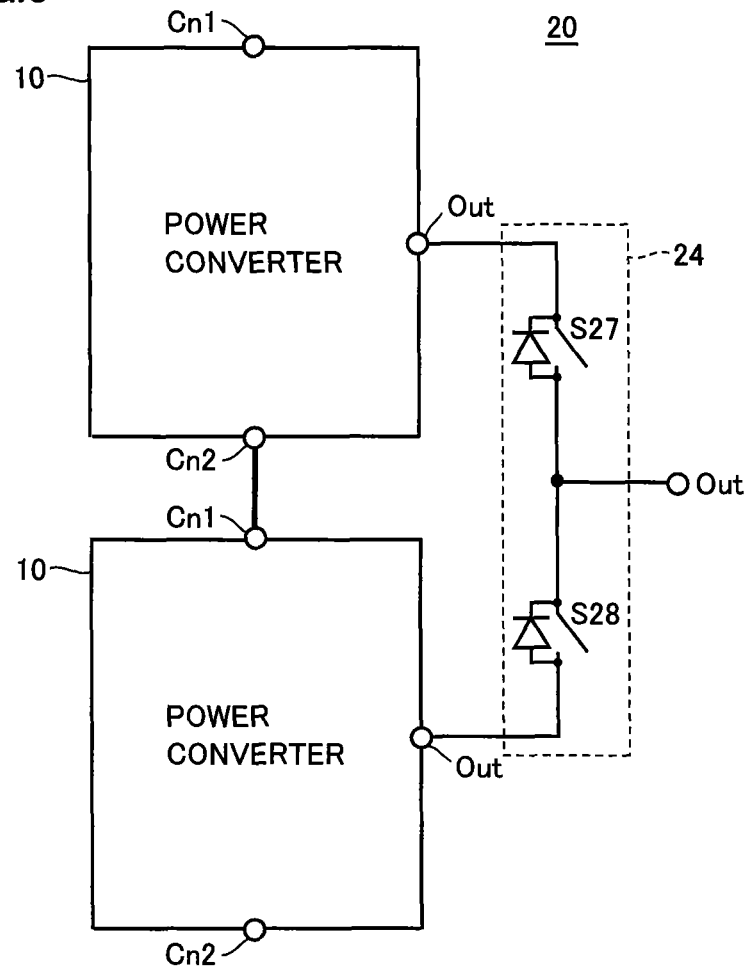
FIG. 3 is a circuit diagram illustrating another circuit configuration of a power converter according to the embodiment of the present invention.

FIG. 3 is a circuit diagram illustrating another circuit configuration of a power converter according to the embodiment of the present invention. A power converter 20 illustrated in FIG. 3 includes two power converters 10 illustrated in FIG. 1 connected in series, and a switch circuit 24 for selecting an output from either one of two power converters 10. The connection between two power converters 10 can be implemented by coupling connection terminal Cn1 of one of power converters 10 to connection terminal Cn2 of the other power converter 10. Switch circuit 24 includes switch elements S27 and S28, and selects an output from either one of two power converters 10 when switch element S27 or S28 is turned on. Thus, power converter 20 is implemented as a seventeen-level inverter capable of outputting seventeen different levels of voltages.

As described above, in the power converter according to the embodiment of the present invention, the number of levels of voltages to be output is increased by increasing the numbers of multilevel inverters connected in series and switch circuits. This can be generalized as follows.

In other words, the power converter according to the embodiment of the present invention includes a group of serial three-level inverters having $2^n$ three-level inverters connected in series (n is 2 or more), and a switch circuit for selecting an output from either one of two of the three-level inverters in the group of serial three-level inverters, $2^{n-1}$ switch circuits being connected to be able to select an output from either one of two adjacent three-level inverters in the group of serial three-level inverters. When there are two or more switch circuits, the switch circuit in a following stage is connected to be able to select an output from either one of the two switch circuits connected in a previous stage, thereby providing one output from the power converter.

Although the power converter according to the embodiment of the present invention has been described by limiting the number of selections of voltage levels during a single AC cycle for the purpose of simplifying the explanation of the switching operation, a smoother AC voltage can be output by selecting voltage levels a plurality of times by performing the switching operation a plurality of times during a single AC cycle, thereby providing a power converter with suppressed harmonics.

Although the power converter according to the embodiment of the present invention includes capacitors as charge storage elements, this is not intended to be limiting, and DC power sources or batteries may be connected, for example.

Figure 4:
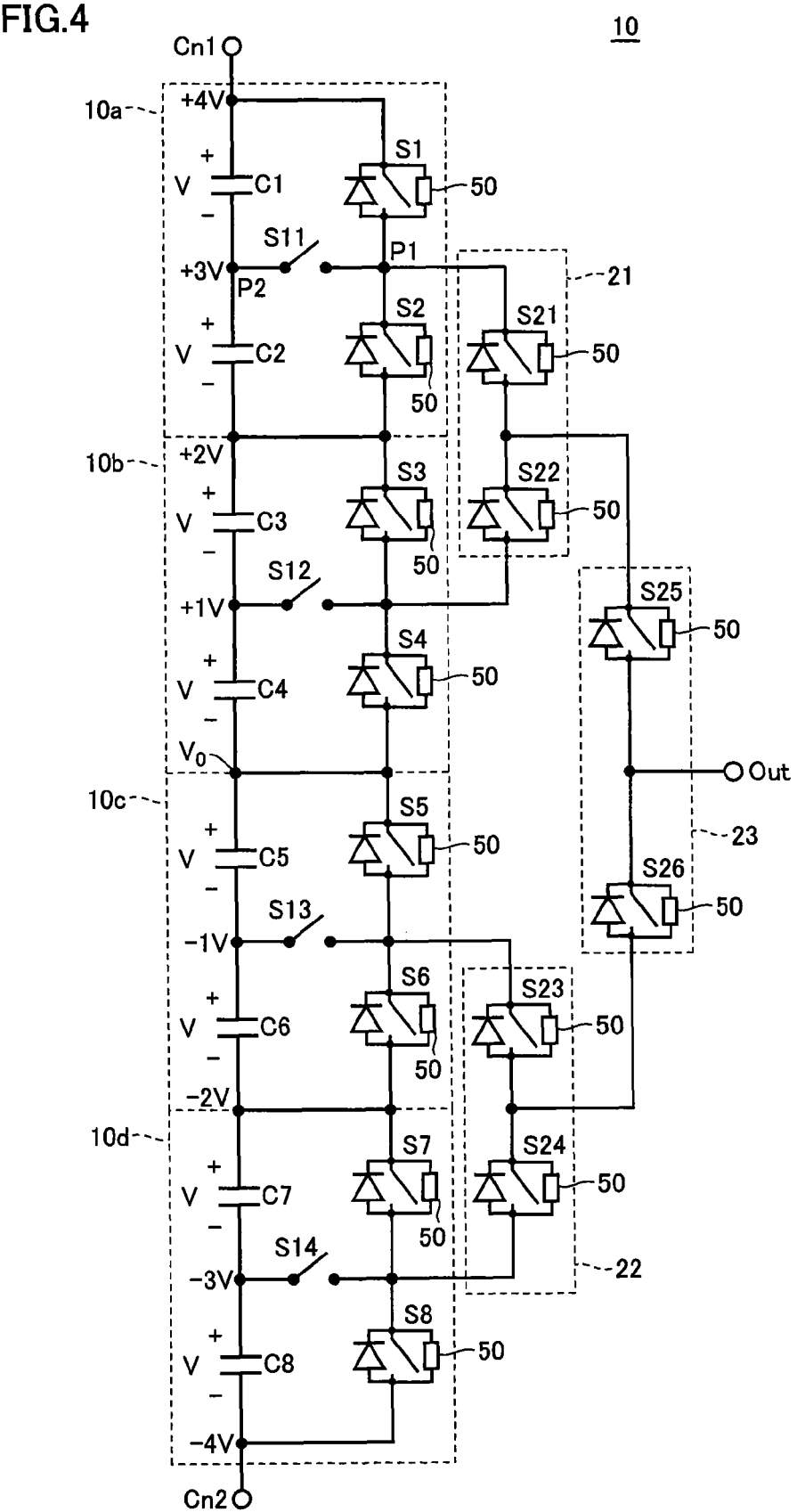
FIG. 4 is a circuit diagram illustrating another circuit configuration of a power converter according to the embodiment of the present invention.

Although the charge storage elements are directly coupled to the switch elements or diodes in the power converter according to the embodiment of the present invention, this is not intended to be limiting, and snubber circuits for suppressing a sudden current variation in transition between on and off of the switch elements may be provided, for example, as illustrated in FIG. 4.

Figure 5:
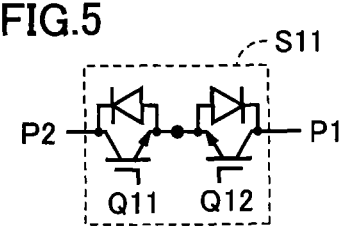
FIG. 5 is a circuit diagram illustrating an example of a configuration of an AC switch having a combination of two semiconductor switches in anti-series.
Figure 6:
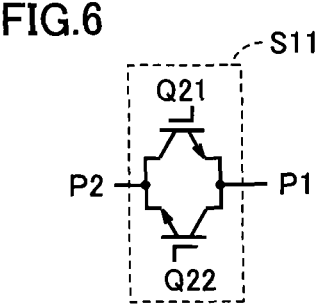
FIG. 6 is a circuit diagram illustrating an example of a configuration of an AC switch having two semiconductor switches of reverse breakdown voltage connected in anti-parallel.
Figure 7:
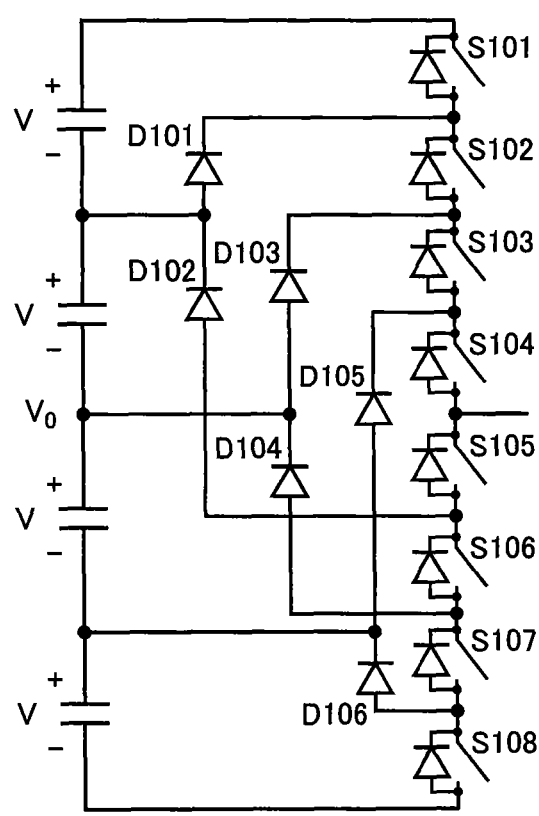
FIG. 7 is a circuit diagram illustrating a circuit configuration of a conventional power converter.

Each of switch elements S11 to S14 may be an AC switch having a combination of two semiconductor switches in anti-series, or an AC switch having two semiconductor switches of reverse breakdown voltage connected in anti-parallel. FIG. 5 is a circuit diagram illustrating an example of a configuration of an AC switch having a combination of two semiconductor switches in anti-series. In the AC switch illustrated in FIG. 5, semiconductor switches Q11 and Q12 are connected in anti-series. FIG. 6 is a circuit diagram illustrating an example of a configuration of an AC switch having two semiconductor switches of reverse breakdown voltage connected in anti-parallel. In the AC switch illustrated in FIG. 6, two reverse-blocking IGBTs (Insulated Gate Bipolar Transistors) serving as semiconductor switches of reverse breakdown voltage are connected in anti-parallel.

It should be understood that the embodiments disclosed herein are illustrative and non-restrictive in every respect. The scope of the present invention is defined by the terms of the claims, rather than the description of the embodiments above, and is intended to include any modifications within the scope and meaning equivalent to the terms of the claims.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A power converter comprising:
a group of serial three-level inverters including $2^n$ three-level inverters each capable of outputting three levels of voltages connected in series, n being an integer of 2 or more; and
a switch circuit for selecting an output from either one of two of said three-level inverters in said group of serial three-level inverters,
said three-level inverters each including
a first switch element and a second switch element connected in series,
a first charge storage element and a second charge storage element connected in series, and
a third switch element for connecting a first node between said first switch element and said second switch element to a second node between said first charge storage element and said second charge storage element,
said first switch element and said second switch element being connected in parallel to said first charge storage element and said second charge storage element,
said three-level inverter being configured to be able to output three levels of voltages by a combination of on states and off states of said first switch element to said third switch element,
said group of serial three-level inverters including $2^n$ said three-level inverters connected in series by repeated connection of a fourth node between said second switch element and said second charge storage element in one of said three-level inverters to a fifth node between said first switch element and said first charge storage element in another of said three-level inverters adjacent to said one of said three-level inverters,
$2^{n-1}$ said switch circuits being connected to be able to select an output from either one of the two adjacent said three-level inverters in said group of serial three-level inverters,
when there are two or more said switch circuits, said switch circuit in a following stage being connected to be able to select an output from either one of two said switch circuits connected in a previous stage, thereby providing one output.

2. The power converter according to claim 1, further comprising a snubber circuit for suppressing a sudden current variation between said first switch element and said first charge storage element, and between said second switch element and said second charge storage element.

3. The power converter according to claim 1, wherein the on states or the off states of said first switch element to said third switch element are selected such that, to said switch circuits for selecting an output from either one of the two adjacent said three-level inverters, a voltage equal to or less than a higher one of the sum of voltages of said charge storage elements in one of the two adjacent said three-level inverters and the sum of voltages of said charge storage elements in the other of the two adjacent said three-level inverters is applied, and to said switch circuit for selecting an output from either one of two said switch circuits connected in said previous stage, a voltage equal to or less than two times the voltage applied to said switch circuits connected in said previous stage is applied.

* * * * *